(No Model.)

T. B. NUTTING.
SULKY HARROW.

No. 287,852. Patented Nov. 6, 1883.

WITNESSES:
Chas. Nida
C. Sedgwick

INVENTOR:
T. B. Nutting
BY Munn & Co.
ATTORNEYS.

UNITED STATES PATENT OFFICE.

THOMAS B. NUTTING, OF MORRISTOWN, NEW JERSEY, ASSIGNOR TO HIMSELF AND THOMAS B. NUTTING, JR., OF SAME PLACE.

SULKY-HARROW.

SPECIFICATION forming part of Letters Patent No. 287,852, dated November 6, 1883.

Application filed February 14, 1883. (No model.)

*To all whom it may concern:*

Be it known that I, THOMAS B. NUTTING, of Morristown, in the county of Morris and State of New Jersey, have invented a new and useful Improvement in Sulky-Harrows, of which the following is a full, clear, and exact description.

Reference is to be had to the accompanying drawings, forming a part of this specification, in which similar letters of reference indicate corresponding parts in all the figures.

Figure 1:
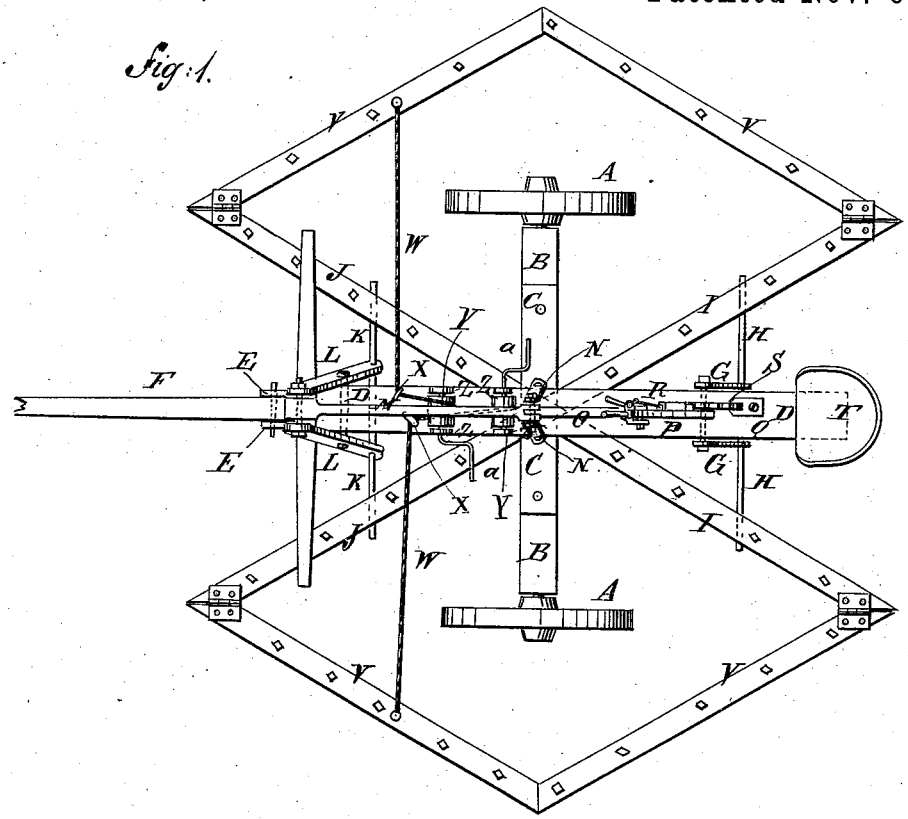
Figure 2:
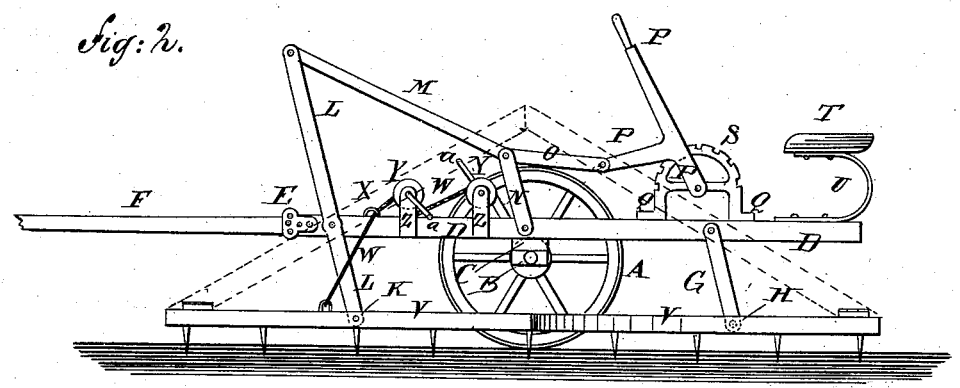
Figure 3:
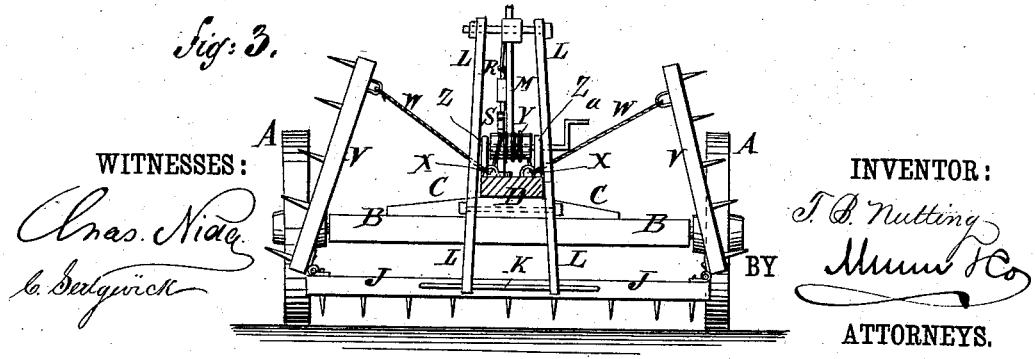

Figure 1 is a plan view of my improvement. Fig. 2 is a side elevation of the same, the near wheel being removed. Fig. 3 is a front elevation of the same, the beam being shown in section.

The object of this invention is to facilitate the adjusting of sulky-harrows, and promote convenience in controlling and operating the said harrows.

A are the wheels, to the axle B of which, or to a block, C, attached to the said axle, is secured the middle part of the beam D.

To the opposite sides of the forward end of the beam D are attached two plates, E, to and between the projecting forward ends of which is bolted the rear end of the tongue F. Several holes are formed in the forward ends of the plates E to receive the fastening-bolt, so that the forward end of the tongue F can be adjusted to the height of the different-sized horses, while keeping the beam D level, or nearly so.

To the rear part of the beam D are hinged, by a bolt or other suitable means, the upper ends of two bars, G, to the lower ends of which is attached a long bolt or rod, H, the end parts of which pass through the rear inner bars, I, of the harrow-frame.

Through the forward inner bars, J, of the harrow-frame are passed the end parts of a rod or long bolt, K, which passes through the lower ends of two parallel levers, L. The levers L are fulcrumed by a bolt to the opposite sides of the forward part of the beam D, and to their upper ends is hinged by a bolt the forward end of a bar, M, the rear end of which is hinged to the adjacent ends of the bars N O. The lower ends of the bars N are hinged by a bolt to the opposite sides of the beam D, and the rear end of the bar O is hinged to the end of the forward arm of the three-armed lever P. The lower arm of the three-armed lever P is hinged to the beam D, or to a support, Q, attached to the said beam. The upper arm of the lever P projects into such a position that it can be readily operated to raise and lower the harrow, and to adjust it to work to any desired depth in the soil. The lever P, and with it the harrow, is held in any position into which it may be adjusted by the pawl R, connected with the said lever and engaging with the teeth of the catch-bar S, formed upon or attached to the support Q or beam D.

T is the driver's seat, which is attached to the upper arm of the U-shaped spring U, the lower arm of which is secured to the rear part of the beam D.

The harrow-frame is made in the form of two diamond-shaped frames placed side by side and rigidly connected at their adjacent angles. The outer bars, V, of the harrow are hinged at their front and rear ends to the front and rear ends of the inner bars, J I, in such a manner that the said outer bars, V, cannot swing down below the level of the inner bars, J I, but can be turned upward and freely for convenience in passing obstructions and in passing through barways, gateways, and other narrow passages. To the forward outer bars, V, are attached the ends of two cords, W, which pass through guides X, attached to the forward part of the beam D, and their ends are attached to two drums, Y, journaled to supports Z, attached to the beam D. To a journal of each of the drums Y is attached a crank, a, for convenience in turning the drums Y to wind and unwind the cords W in raising and lowering the outer bars, V, of the harrow-frame.

The drums Y may be provided with ordinary ratchet-wheels and pawls, for holding them and the bars V of the harrow-frame in any position into which they may be adjusted, which ratchet-wheels and pawls are not shown in the drawings, as there is nothing new in their construction.

The bars I V J are provided with harrow-teeth, which are so arranged that no two teeth will travel in the same track and that the tracks of the several teeth will be equidistant.

With this construction the harrow can be readily raised and lowered and supported in such position as to work at any desired depth in the ground, and the side parts of the harrow-frame can be easily raised to pass obstructions, and to pass through barways, gateways, and other narrow passages.

Having thus described my invention, I claim as new and desire to secure by Letters Patent—

The combination, with a two-wheeled vehicle, of a harrow-frame consisting of two obliquely-crossed tooth-bars and two obtuse-angled frames, the bars and frames being jointed together in alignment with the wheels, or nearly so, as shown and described.

THOMAS B. NUTTING.

Witnesses:
 JAMES T. GRAHAM,
 C. SEDGWICK.